United States Patent [19]

Sciaino, Jr.

[11] 3,995,902
[45] Dec. 7, 1976

[54] CORN HOLDER CONSTRUCTION

[76] Inventor: Bartolo Sciaino, Jr., 60 Albion St., Passaic, N.J. 07508

[22] Filed: May 1, 1975

[21] Appl. No.: 573,405

[52] U.S. Cl. .................................. 294/5; 30/143
[51] Int. Cl.² .................................. A46G 21/00
[58] Field of Search ............... 294/1 R, 5, 61, 86 R; D7/42, 106, 148; 30/114, 121.5, 124, 143, 147, 148, 151, 152, 164, 164.5, 164.7; 99/419, 421 A

[56] References Cited
UNITED STATES PATENTS

| | | | |
|---|---|---|---|
| 301,976 | 7/1884 | Forsyth | 30/148 X |
| 714,310 | 11/1902 | Laws | 30/151 |
| 889,434 | 6/1908 | Bustanoby | 294/5 X |
| 920,235 | 5/1909 | Aagaard | 30/148 X |
| 1,539,669 | 5/1925 | Hauser | 294/5 |
| 1,632,227 | 6/1927 | Halsey | 30/164.5 X |
| 1,814,547 | 7/1931 | Edwards | 30/143 |
| 3,056,200 | 10/1962 | Williams | 30/148 |
| 3,805,384 | 4/1974 | Falcone | 30/121.5 |
| D209,158 | 11/1967 | Levin | D7/42 |

*Primary Examiner*—Johnny D. Cherry
*Attorney, Agent, or Firm*—McGlew and Tuttle

[57] ABSTRACT

A corn holder comprises a first tubular element which is telescopic with respect to a second tubular element. Each tubular element includes a facing end with an outwardly projecting corn piercable tine and each includes a cavity in the facing end for receiving tine of the other cavity when the two tubular elements are telescopically engaged. The tines are advantageously shaped so that they occupy a portion of a complete tube for example a semi-cylindrical shape with the dimensions of the tine being such that the interengagement of the two tine elements is sufficiently snug so that they remain frictionally interengaged. The tines may be of varying shape and configuration and may even be solid rod elements which fit into receiving cylindrical recesses of the opposite tubular member.

8 Claims, 18 Drawing Figures

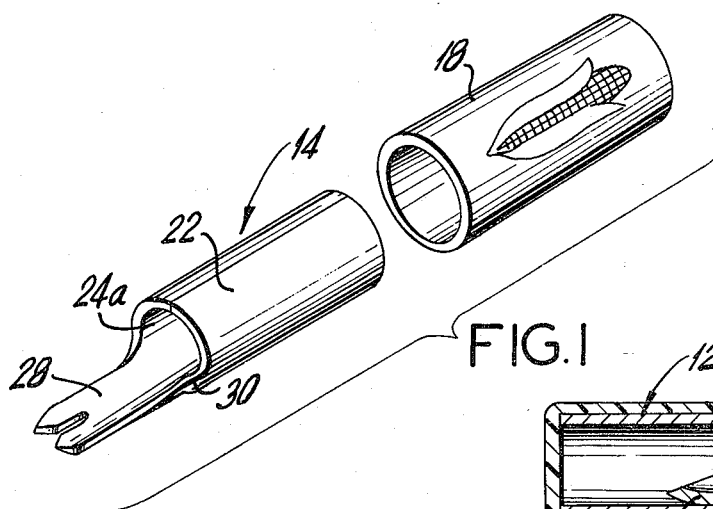
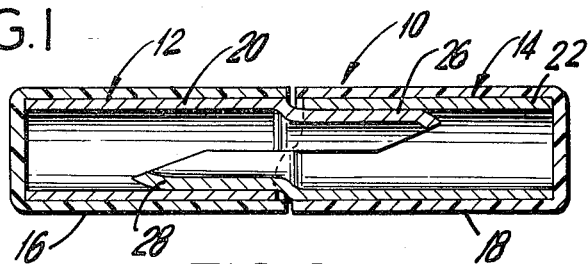
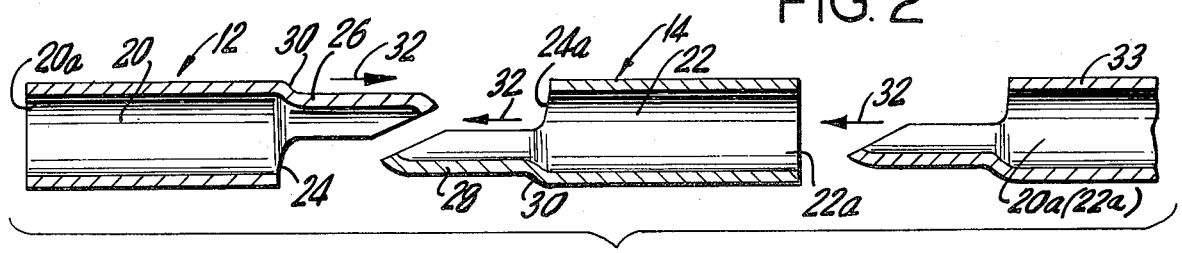
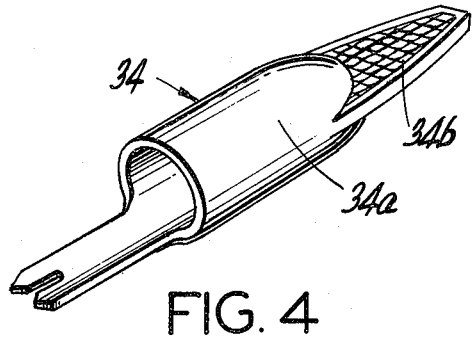
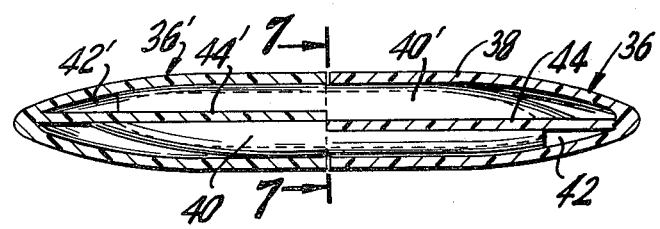
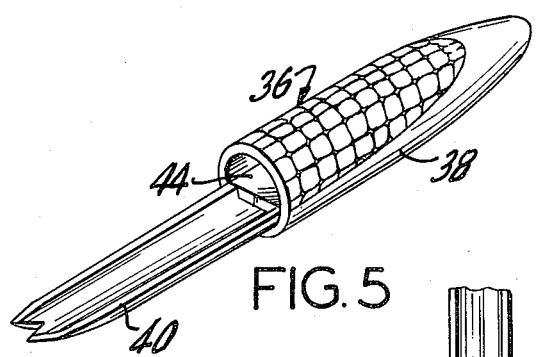
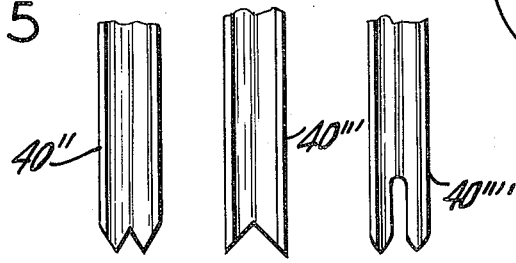
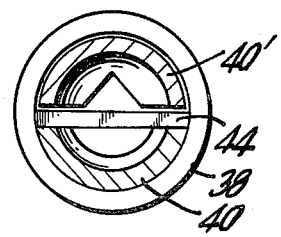

CORN HOLDER CONSTRUCTION

BACKGROUND OF THE INVENTION

1. FIELD OF THE INVENTION

This invention relates in general to the construction of a corn holder and in particular to new and useful telescopically interengageable corn holder members having corn piercing tines which are received in the recesses of the associated engageable member and also to an improved holder for the whole body of the corn receiving elements for the individual tines.

2. DESCRIPTION OF THE PRIOR ART

Many types of corn holders are known and a large number of them include elements which pierce the corn so that the piercing element may extend outwardly from each end of the corn and provide a handle for holding the corn so that a person's fingers may not become soiled when eating it. A disadvantage of the known holders is that the piercing ends or tines present sharp points which are dangerous and it is not easy to cover them when the elements are stored or not in use. In addition the exposed tine elements occupy a great deal of drawer space and present exposed piercing points which make their storage and handling difficult.

SUMMARY OF THE INVENTION

In accordance with the present invention there is provided a corn holder which comprises two telescopic elements each of which includes a facing end having a tine or corn piercing member projecting outwardly therefrom and each of which includes a recess or cavity in this same end for the telescopic reception of the tine of the other member. The holders may advantageously comprise hollow tubular members with outer facing ends having tines formed as extension of the outer tubular wall of the holder and terminating in one or more corn piercing points. Such ends made so that they occupy a portion of the circumference of the complete tubular member and they are indented inwardly so that they may be engaged into the remaining portion of a similarly formed tubular member. The circumferences of the tine portions may be such that they interfit in tight engagement within the remaining space of the opposite tine member with which they are telescopically engageable. The tines of course may be made of separate elements which are secured into hollow tubular members which form the handles of the elements and the handles may have dividing walls to receive the tines at opposite sides thereof. The engagemet of the tine within the receiving tubular element a pair of corn holders may be partial in respect to the length of the tines or complete in accordance with the length of the receiving handle and the recess defined therein. One of the handles may be formed as a substantially solid member having only small round cylindrical openings for receiving rod like tines of the other member. The tines may be formed as cylindrical rod members which extend outwardly from the end of the handle portion and the handle portion is adapted to have openings which are disposed at for example 90° to the tine members so that the tines of one of the handle members may be rotated 90° to the tines of the other handle member and interengaged in the receiving openings.

The apparatus may also advantageously include a holder for the corn with cylindrical elements thereon capable of receiving and storing one or both handles either when they are telescopically interengaged or when each handle alone is inserted therein.

Accordingly it is an object of the invention to provide an improved device for holding corn which includes a pair of first and second telescopic elements or members each having a facing end with a projecting corn piercing tine and each having a receiving cavity extending inwardly from the facing end of a size to accommodate the tine of the other member of the pair for telescopic interengagement therewith.

A further object of the invention is to provide a corn holder which is made inexpensively from a single tubular element having an end with a projecting tine formed of less than a major portion of the circumference of the tubular element and with the tine being offset radially inwardly around its circumference so that it may be accommodated in the other of the pair of tine members in the portion thereof not occupied by the tine of this member.

A further object of the invention is to provide a simple and inexpensive corn holder which includes a handle portion having receiving recesses and projecting tines arranged so that the recesses receive the tines of the similarly formed holder which may be telescopically interengaged therewith.

A further object of the invention is to provide a corn holder which includes a trough for receiving a whole corn having at least one tubular member mounted along a top edge thereof and a corn holder positioned in the tubular member of tubular configuration.

A further object of the invention is to provide a corn holder which is simple in design, rugged in construction and economical to manufacture.

For an understanding of the principles of the invention, reference is made to the following description of typical embodiments thereof as illustrated in the accompanying drawings.

BRIEF DESCRIPTION OF THE DRAWINGS

In the Drawings:

FIG. 1 is an exploded perspective view of a corn holder element and a housing therefor constructed in accordance with the invention;

FIG. 2 is a longitudinal sectional view of a pair of corn holders arranged in a housing similar to that shown in FIG. 1;

FIG. 3 is an exploded perspective view indicating the interengagement of a plurality of individual holders of a construction similar to that shown in FIG. 1;

FIG. 4 is a perspective view of another embodiment of the holder;

FIG. 5 is a perspective view of still another embodiment of the corn holder;

FIG. 6 is a longitudinal sectional view of a pair of telescoped corn holders constructed in accordance with FIG. 5;

FIG. 7 is a section taken along the line 7—7 of FIG. 6;

FIGS. 8a, 8b and 8c are partial top plan views of various constructions of tines;

GENERAL DESCRIPTION OF THE PREFERRED EMBODIMENTS

Figure 9:
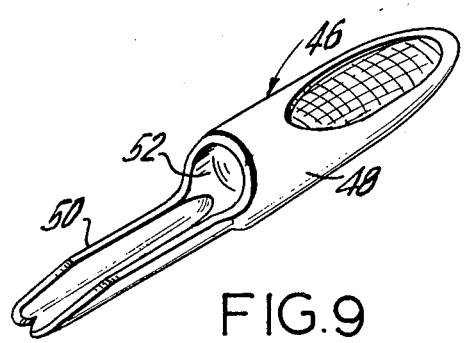
FIGS. 9 and 10 are perspective views of still another embodiment of corn holder.

Referring to the drawings in particular, the invention embodied therein as shown in FIGS. 1 to 3 comprises a pair of closed telescopically engaged corn holders with a cover thereover generally designated 10 which comprises individual corn holder members 12 and 14 which are enclosed by outer cover members 16 and 18.

In accordance with the invention the corn holders 12 and 14 each comprise cylindrical hollow tubular members or elements 20 and 22 respectively having facing ends 24 and 24a which have corn piercing elements or tines 26 and 28 respectively.

In accordance with one feature of the invention the tines 26 and 28 are formed as a portion of the wall of the tubular members indented at 30 so that they are offset radially inwardly around their complete circumference and formed only of a minor portion of the complete circumference of the tubular portion of the cylindrical hollow tubular members 20 and 22. The tines 26 and 28 are of a circumferential extent such that they may be accommodated within the hollow interior of the hollow tubular members 20 and 22 in telescopic interengagement by interfitting them as shown by the arrows 32 in FIG. 3. The circumferential dimensions of the tines 26 and 28 may be such that they are interfitted with a close interengagement or they may be telescoped together as shown in FIG. 2 with a relatively loose fitting in circumferential directions. The covers 16 and 18 are advantageously made of an inexpensive material such as a metal stamping or of a plastic. In addition the holders themselves may also be formed of a metal stamping or casting of aluminum or similar material. The corn holders 12 and 14 may be stacked by telescopic interengagement and in addition an added corn holder 33 may be placed into an open outer end 20a or 22a so that four separate holders may be stacked.

FIG. 4 shows a perspective view of another embodiment of holder generally designated 34 which comprises a hollow tubular handle portion 34a having a flattened end 34b. As shown in FIG. 5 a corn holder generally designated 36 may comprise a handle portion 38 having separately formed tine elements 40 having bases 42 which are secured below dividing walls 44 which extend through the interiors of the handles 38 below the center line thereof so that it may be telescopically engaged with a similar holder generally designated 36'. As shown in FIG. 7 the tines 40' are dimensioned so that they loosely fit within the handle portion 38 but the tines 40 are shown as being dimensioned so that they would tightly engage against the partition wall 44' for a tight wedging fit.

Examples of the construction of the tines 40'', 40''' and 40'''' are shown in FIGS. 8a, 8b and 8c respectively.

Figure 10:
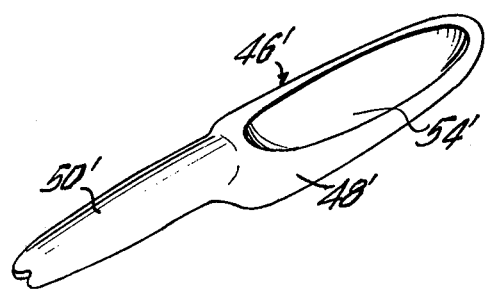
Figure 11:
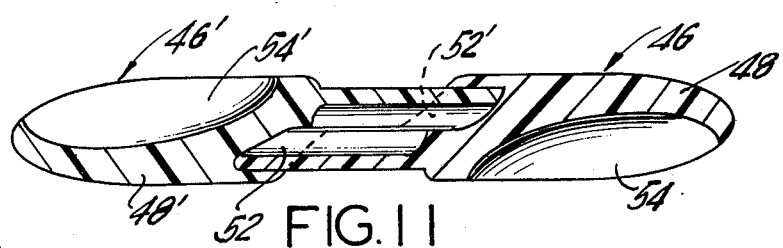
FIG. 11 is a longitudinal sectional view of a telescoped pair of corn holders of another embodiment.

FIGS. 9, 10 and 11 show another embodiment of corn holder which comprises individual corn holder elements 46 and 46' each having a hollow handle portion 48 and 48' respectively and each having radially indented tine forming portions 50 and 50' respectively. In this embodiment the handle portions 48 have only slight recesses 52 and 52' respectively and there is not complete telescopic interengagement. With such a construction the entire element may be made of a molded plastic material and the handle portions 48 and 48' may be hollowed at 54 in order to save material.

Figure 12:
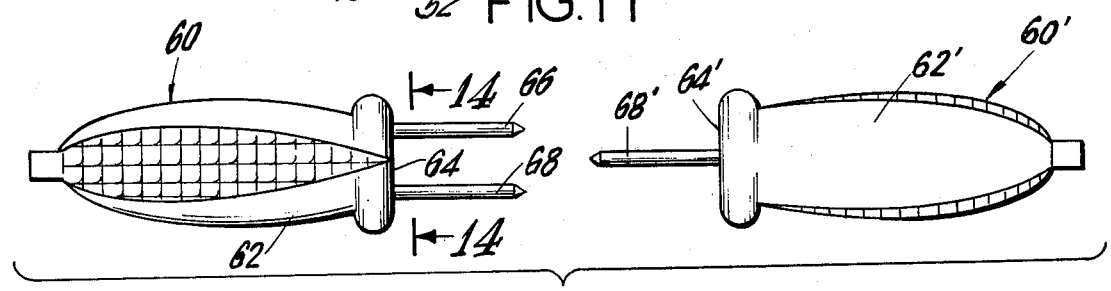
FIG. 12 is an exploded elevational view of another embodiment of interengageable corn holders.
Figure 13:
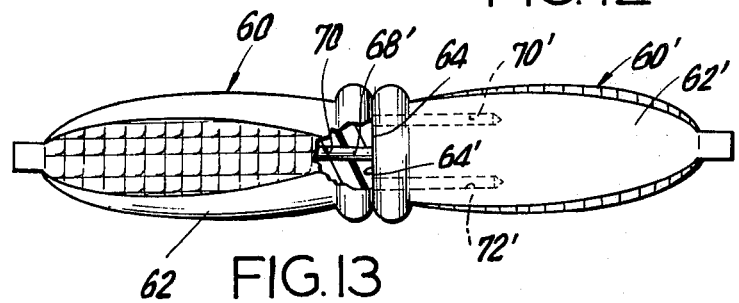
FIG. 13 is a partial elevational and partial sectional view of the pair of interengaged corn holders constructed in accordance with FIG. 12.
Figure 14:
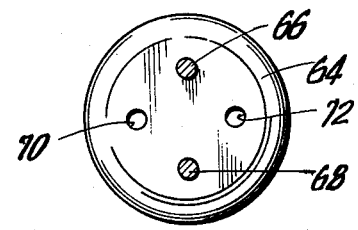
FIG. 14 is a section taken along the line 14—14 of FIG. 12.

The embodiment shown in FIGS. 12 to 14 comprises a pair of corn holders generally designated 60 and 60' in which the handle portions 62 and 62' are made of substantially solid form and each has a facing end 64 and 64' respectively having a pair of diametrically opposite projecting tines 66 and 68 and 66' and 68' and a pair of diametrically opposite receiving recesses 70 and 72 and 70' and 72' which are arranged at 90° to their associated tines and are of a length to accommodate the full length of the tines when they are arranged in telescopic interengagement as shown in FIG. 13.

Figure 15:
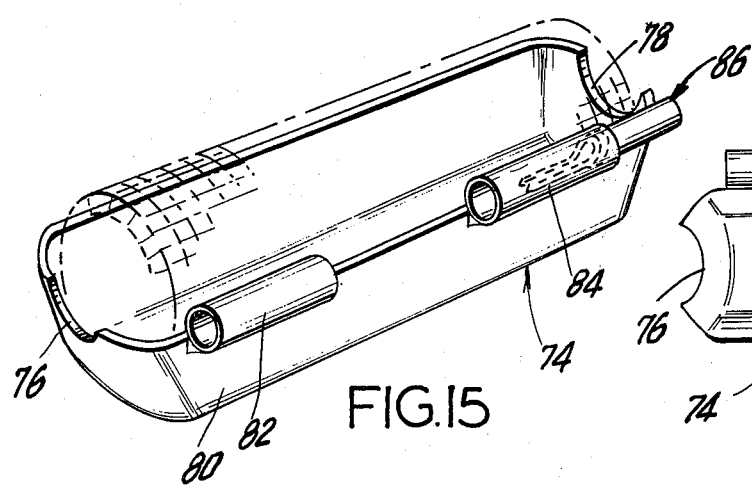
FIG. 15 is a front top perspective view of the corn base holder with mounting elements for the individual corn holders.
Figure 16:
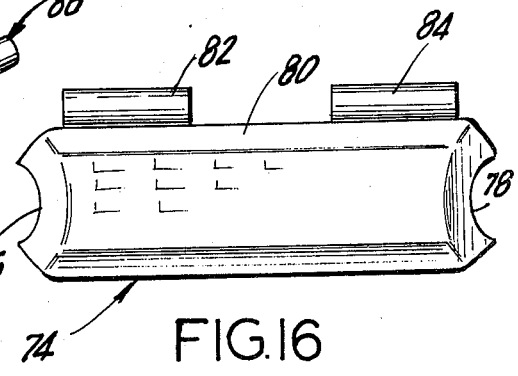
FIG. 16 is a top plan view of the corn base holder shown in FIG. 15.

As shown in FIG. 15 the corn holder may include a corn base holder 74 which comprises a trough having a circular recesses 76 and 78 at the respective ends thereof. In addition the trough has a side wall 80 which mounts cylindrical holders 82 and 84. The holders are of a size to accommodate individual corn holding elements generally designated 86 which may be themselves telescopically interengaged as described in respect to the other embodiments or positioned singularly in the respective ends of the tubular holders 82 and 84.

It has been found that the tines may be easily fashioned with any desired point or end formation and they may be made to lengths of varying dimensions for example a preferred length is from one half to one and one half inches.

While specific embodiments of the invention have been shown and described in detail to illustrate the application of the principles of the invention, it will be understood that the invention may be embodied otherwise without departing from such principles.

What is claimed is:

1. A corn holder comprising first and second holder members each having a circularly cylindrical handle portion with a facing end having an axially extending arcuate portion defining a corn piercing tine offset radially inwardly and projecting axially outwardly from said facing end and having a corn engaging pointed end, said holder members each defining a cylindrical receiving cavity extending inwardly from said facing end of a size to accommodate the corn piercing tine of the other member for telescopic interengagement therewith, the facing ends of said first and second holders being disposable in a substantially abutting position when said first and second holder members are interengaged, and being disposed in an interengaged position the arcuate portions which define the tines being disposed in diametrically opposite positions and extending in respective opposite axial directions into the associated cylindrical handle portion offset radially from the tine of the other handle portion.

2. A corn holder according to claim 1 wherein said holder members are hollow tubular members with closed ends opposite said facing ends and having a partition wall extending diametrically therethrough, said tines comprising separate members having a base portion secured in said handle portion below the partition wall.

3. A corn holder according to claim 2 wherein said partition wall is located below the central axis of each handle portion, said tines being formed as partially cylindrical elements of a circumference permitting them to be fitted below the partition wall of the other of said holder members.

4. A corn holder according to claim 1 including an elongated trough like corn base member for accommodating a whole ear of corn having a wall with a tubular housing thereon, said first and second holder members being of a size to be accommodated in said tubular housing.

5. A corn holder according to claim 1 wherein said tines are bifurcated and have pointed ends.

6. A corn holder according to claim 1 wherein said handle portion comprises a hollow holder having a partition therethrough, said tine comprising a separate tine element having a curvature complementary to the interior of said handle portion and being engaged in said handle portion below said partition.

7. A corn holder according to claim 1 wherein said handle portion and said tine are formed of an integral single piece of material.

8. A corn holder according to claim 1, wherein each handle portion includes an end opposite to said facing end which is closed and including a flattened thumb engagement portion extending axially outwardly from said cylindrical portion in an opposite direction from the associated tine.

* * * * *